US010018749B2

(12) United States Patent
Cooper

(10) Patent No.: US 10,018,749 B2
(45) Date of Patent: *Jul. 10, 2018

(54) DISTRIBUTED OPTICAL SENSORS FOR ACOUSTIC AND VIBRATION MONITORING

(71) Applicant: Daniel Boyd Cooper, Christiansburg, VA (US)

(72) Inventor: Daniel Boyd Cooper, Christiansburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/886,718

(22) Filed: Oct. 19, 2015

(65) Prior Publication Data

US 2017/0108615 A1    Apr. 20, 2017

(51) Int. Cl.
*E21B 43/12* (2006.01)
*E21B 47/00* (2012.01)
(Continued)

(52) U.S. Cl.
CPC ............ *G01V 11/002* (2013.01); *E21B 47/00* (2013.01); *E21B 47/123* (2013.01); *G01H 9/004* (2013.01); *G01V 2210/1429* (2013.01)

(58) Field of Classification Search
CPC ......... G01V 11/002; G01V 2210/1429; G01H 9/004; E21B 47/00; E21B 47/123
See application file for complete search history.

(56) References Cited

U.S. PATENT DOCUMENTS 5,513,913 A * 5/1996 Ball .................... G01D 5/35383
                                                      250/227.14
5,754,293 A * 5/1998 Farhadiroushan . G01D 5/35383
                                                      356/478
(Continued)

FOREIGN PATENT DOCUMENTS

| WO | 2008075238 A1 | 6/2008 |
| WO | 0204984 A3 | 7/2011 |
| WO | 2015057224 A1 | 4/2015 |

OTHER PUBLICATIONS

Garcia, et al.; "Vibration Detection Using Optical Fiber Sensors", Aug. 2010; Journal of Sensors; Hindawi Publishing Corporation; 12 pages.

(Continued)

*Primary Examiner* — Benjamin F Fiorello
(74) *Attorney, Agent, or Firm* — Cantor Colburn LLP

(57) ABSTRACT

An apparatus for sensing vibration in a borehole penetrating the earth includes an optical fiber having a plurality of pairs of reflectors configured to reflect light between each of the pairs of reflectors in the plurality, wherein each pair of reflectors is separated by a nominal distance L and an adjacent pair of reflectors in the plurality are separated by a nominal distance D, and an optical interrogator configured to sense a distance between each pair of reflectors in the plurality over time to sense the vibration. A laser emits semi-coherent light over a swept range of wavelengths to illuminate the optical fiber, wherein the semi-coherent light provides for sensing over distance L in the optical fiber between each pair of reflectors and for no sensing in the optical fiber over distance D between different pairs of reflectors. A photodetector senses light received from the optical fiber.

23 Claims, 8 Drawing Sheets

(51) Int. Cl.
    *G01V 11/00*     (2006.01)
    *E21B 47/12*     (2012.01)
    *G01H 9/00*     (2006.01)

(56) References Cited

U.S. PATENT DOCUMENTS

| | | |
|---|---|---|
| 6,601,671 B1 | 8/2003 | Zhao et al. |
| 9,377,559 B2 * | 6/2016 | Cooper .................. G01H 9/004 |
| 2004/0141420 A1 | 7/2004 | Hardage et al. |
| 2013/0271769 A1 | 10/2013 | Handerek |
| 2015/0075275 A1 | 3/2015 | Cooper |

OTHER PUBLICATIONS

Notification of Transmittal of the International Search Report and the Written Opinion of the International Searching Authority, or the Declaration; PCTUS2016/051634; dated Dec. 22, 2016; 14 pages.

\* cited by examiner

DISTRIBUTED OPTICAL SENSORS FOR ACOUSTIC AND VIBRATION MONITORING

BACKGROUND

Boreholes are drilled into geologic formations to provide access to hydrocarbons in reservoirs. Completed boreholes, which may be referred to as wells, typically include many different types of well completion equipment and devices such as packers, valves and pumps for extraction of hydrocarbons. During operation, the well completion equipment and devices may be subject to vibration. Vibration may provide indication of operational status of the equipment and devices or it may provide indication of the environment to which the equipment and devices are subjected. Hence, it would be well received by the hydrocarbon production industry if reliable vibration sensors were developed to monitor vibration of the well completion equipment and devices for operational purposes or to improve reliability.

BRIEF SUMMARY

Disclosed is an apparatus for sensing vibration in a borehole penetrating the earth. The apparatus includes: an optical fiber disposed in the borehole and comprising a plurality of pairs of reflectors configured to reflect light between each of the pairs of reflectors in the plurality, wherein each pair of reflectors is separated by a nominal distance L and an adjacent pair of reflectors in the plurality are separated by a nominal distance D; and an optical interrogator coupled to the optical fiber and configured to sense a distance between each pair of reflectors in the plurality over time to sense the vibration. The optical interrogator includes: a laser configured to emit semi-coherent light over a swept range of wavelengths to illuminate the optical fiber, wherein the semi-coherent light provides for sensing over the nominal distance L in the optical fiber between each pair of reflectors and for no sensing in the optical fiber over the nominal distance D between different pairs of reflectors; and a photodetector configured to sense light from the optical fiber and provide a photodetector output signal indicative of an amount of sensed light.

Also disclosed is an apparatus for sensing vibration in a borehole penetrating the earth. The apparatus includes a first pair of optical fibers and a second pair of optical fibers disposed in the borehole, each optical fiber comprising one reflector such that light is reflected between the two reflectors in the first pair of optical fibers and in the two reflectors in the second pair of optical fibers, wherein a first pair of reflectors in the first pair of optical fibers has a path distance D1 and a second pair of reflectors in the second pair of optical fibers has a distance D2 wherein D1 is less than D2; and an optical interrogator coupled to the optical fiber and configured to sense a distance between each pair of reflectors in the first pair of optical fibers and the second pair of optical fibers over time to sense the vibration. The optical interrogator includes: a laser configured to emit semi-coherent light over a swept range of wavelengths to illuminate the first pair of optical fibers and the second pair of optical fibers, wherein the semi-coherent light is coherent over D1 and not coherent over a differential distance D2–D1; and a photodetector configured to sense light from the first pair of optical fibers and the second pair of optical fibers and provide a photodetector output signal indicative of an amount of sensed light.

Further disclosed is a method for sensing vibration in a borehole penetrating the earth. The method includes disposing an optical fiber in the borehole, the optical fiber comprising a plurality of pairs of reflectors configured to reflect light between each of the pairs of reflectors in the plurality, wherein each pair of reflectors is separated by a nominal distance L and an adjacent pair of reflectors in the plurality are separated by a nominal distance D, and sensing a distance between each pair of reflectors in the plurality over time to sense the vibration using an optical interrogator coupled to the optical fiber. The optical interrogator includes: a laser configured to emit semi-coherent light over a swept range of wavelengths to illuminate the optical fiber, wherein the semi-coherent light provides for sensing over the nominal distance L in the optical fiber between each pair of reflectors and for no sensing in the optical fiber over the nominal distance D between different pairs of reflectors; and a photodetector configured to sense light from the optical fiber and provide a photodetector output signal indicative of an amount of sensed light.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for sensing vibration in a borehole penetrating the earth. Various embodiments of the apparatus and method are disclosed that sense vibration by sensing a change in distance over time between two reflectors in an optical fiber illuminated by light. The optical fiber may include multiple pairs of reflectors. Semi-coherent light is used to illuminate the optical fiber such that the semi-coherent light is coherent between each pair of reflectors and not coherent between the pairs of reflectors. The coherence length of semi-coherent light in this disclosure is generally on the order of meters. By sensing vibration of one or more downhole devices, one or more downhole actions may be implemented using sensed vibration data. The term "downhole" relates to being in the borehole beneath the surface of the earth.

Figure 1:
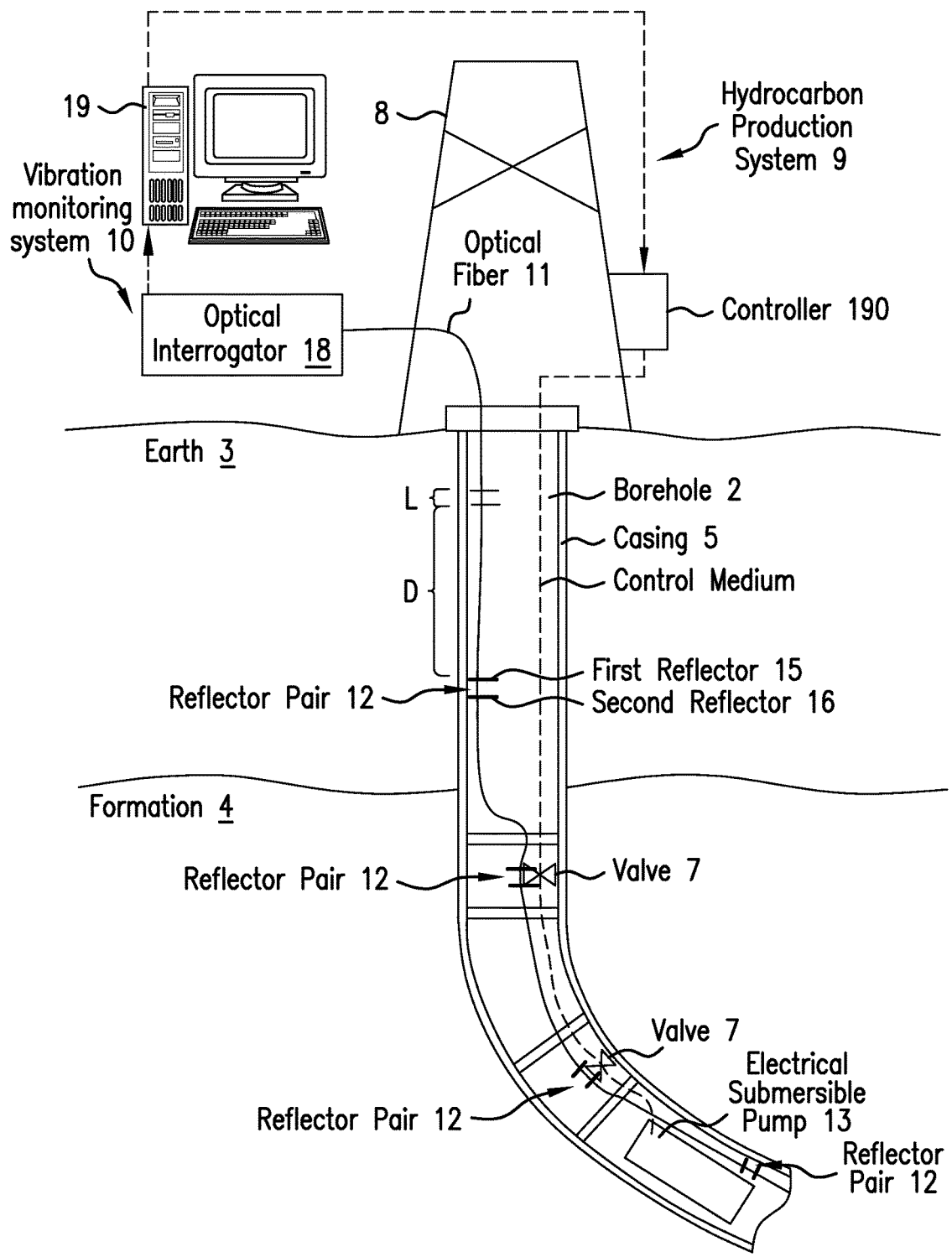
FIG. 1 illustrates an embodiment of a vibration monitoring system for monitoring vibration in downhole equipment and devices in a hydrocarbon production system for extracting hydrocarbons from an earth formation using a borehole penetrating the earth formation.

FIG. 1 illustrates an embodiment of a vibration monitoring system 10 for monitoring vibration in downhole equipment and devices in a hydrocarbon production system 9 for extracting hydrocarbons from an earth formation 4 using a borehole 2 penetrating the earth 3. The borehole 2 may be lined with a casing 5 having perforations in different zones to allow formation fluids to flow from the formation 4 into the borehole 2 and then to the surface of the earth 3. The hydrocarbon production system 9 includes a production rig 8. The production rig 8 includes all equipment at the surface (e.g., piping, valves and pumps) and downhole necessary to extract the hydrocarbons. Non-limiting embodiments of downhole production equipment include packers 6 configured for isolating zones in the borehole 2, valves 7 configured for controlling fluid flow from different zones in the formation 4, and an electrical submersible pump 13 for downhole pumping of formation fluids to the surface. The hydrocarbon production system 9 further includes a controller 190 configured to control downhole production equipment such as opening, closing or setting a position of a valve 7 or starting or shutting down an electrical submersible pump 13 as non-limiting embodiments.

The vibration monitoring system 10 includes an optical fiber 11 disposed in the borehole 2 and having multiple pairs of reflectors 12. Each pair a reflectors 12 include a first reflector 15 and a second reflector 16 separated from the first reflector 15 by a nominal distance L. The term "nominal" relates to the optical fiber being in a reference state against which changes in the distance L are measured. In one or more embodiments, the reference state is the state in which the optical fiber is not experiencing strain. The reflectors as disclosed herein are broadband reflectors that can reflect a broad band of wavelengths of light such as inclusive of a range of wavelengths in a swept-wavelength range. Non-limiting embodiments of the broadband reflectors include chirped fiber Bragg gratings, intrinsic Fabry-Perot interferometers, and extrinsic Fabry-Perot interferometers. Each pair of reflectors 12 is separated from an adjacent pair of reflectors by a nominal distance D. In one or more embodiments, L is in a range of about two centimeters to one meter and D is on the order of about 10 to 100 meters. In one or more embodiments, the swept wavelength range is on the order of 10 to 100 nanometers (nm) with a sweep rate on the order of 10 nm/sec. The optical fiber 11 may be secured to downhole production equipment in order to measure vibration of the downhole production equipment to which the optical fiber 11 is attached. The optical fiber 11 may be secured to the downhole production equipment by an adhesive or a mechanical fastener as non-limiting embodiments. In one or more embodiments, the optical fiber 11 is secured to downhole production equipment at a pair of reflectors 12 such that vibration of the downhole equipment will cause the distance between the first reflector 15 and the second reflector 16 to vary or in sympathy with (i.e., in accordance with) the vibration of the downhole equipment. In one or more embodiments, the optical fiber 11 may be wrapped around a downhole valve or secured to a pipe connected to the downhole valve and run over the downhole valve. In one or more embodiments, the optical fiber 11 may be embedded in cement behind the casing 5 in order to listen to downhole acoustic sounds.

The vibration monitoring system 10 further includes an optical interrogator 18 configured to measure the distance D1 between the first reflector 15 and the second reflector 16 in each pair of reflectors 12. The optical interrogator 18 does this by illuminating the optical fiber 11 with semi-coherent light emitted by a laser and receiving a light signal in return with a photodetector. The term "semi-coherent" relates to light having a wavelength or range of wavelengths such that the illuminating light causes sensing in the optical fiber 11 between the first reflector 15 and the second reflector 16 that can be quantified so that the distance between the first reflector 15 and the second reflector 16 can be measured while the illuminating light does not cause sensing in the optical fiber 11 between adjacent pairs of reflectors 12. A processor in the optical interrogator 18 or a surface computer processing system 19 is configured to receive measurements of the distance between the first reflector and the second reflector in each pair of reflectors as a function of time so that an amplitude and frequency of vibration can be determined. The optical interrogator 18 with the optical fiber 11 can be calibrated at the surface using one or more known vibrations having known amplitude and frequency.

Theory of the optical interrogator 18 is now discussed. In the case of Optical Frequency Domain Reflectometry (OFDR), as has been taught in the prior art, the interference between the first reflector and the second reflector is given by:

$$I \propto \cos\left(\frac{4\pi nL}{\lambda}\right) = \cos(4\pi nL\alpha t)$$

where α represents the rate at which the wave length of the emitted light is swept, and L represents the distance between the two reflectors in a pair, n represents the index of refraction of the glass forming the optical fiber, and λ represents the instantaneous wavelength of the emitted light. It is noted that the signal is sinusoidal, and that the frequency of the signal is determined by the distance between the two reflectors. Thus, interference signals associated with reflectors located at different locations along the fiber will appear at different frequencies in the recovered interference signal as detector by the photodetector. This means that the signal associated with each individual reflector pair can be isolated from all others by means of spectral filtering.

In semi-coherent optical frequency domain reflectometry (SOFDR) as disclosed herein amplitude modulation is applied to the light emitted by the laser. In SOFDR, the amplitude modulation represents a chirped sinusoid—the frequency of the modulation signal is constantly and linearly increasing. Light emitted at a given instance in time is modulated at a frequency controlled by when it was emitted. However, a finite amount of time is required for light to travel down the fiber, reflect off a given sensor reflector, and return to the interrogator; the amount of time this requires is determined by the location of the reflector pair within the fiber. During this period of time, the frequency of the modulation has shifted, since the modulation signal is being chirped. As a result, when the signal out of the photodetector is heterodyned with the electrical signal being sent into a modulator acting to modulate the laser emitted light, the signal originating from a sensing reflector pair will be frequency shifted to an intermediate frequency; this frequency being entirely determined by the location of the reflector pair in the optical fiber, since this determines the time delay applied to the signal. The end affect here is that signals originating from different reflector pairs are separated spectrally from other reflector pairs, and can be separated by spectral filtering operations.

To clarify, in SOFDR a pair of broadband reflectors are in close proximity to one another (for example, ten centimeters apart). Such pairs would be located a much greater distance (ten meters, for example) from any other such pair. Each pair represents a single measurement location, for which one measurement is obtained.

The laser is intended to be semi-coherent, with a coherence length on the same order as a pair of broadband reflectors (as discussed above, this would be on the order of ten centimeters). The coherence length governs how far apart reflectors can be and their reflections interfere with one another, and is related to how close a wave source comes to emitting a single frequency (this same information can alternatively be presented in the spectral domain as the linewidth of a laser, representing the width of the spectral band over which the laser transmits). Commercial lasers are available with linewidths of many kilometers.

Because the distance separating two reflectors forming a pair is on the same (or lesser) order than the coherence length of the laser, both reflections returning from an individual sensor pair interfere with one another. Because the laser is being swept in wavelength, this interference signal will be sinusoidal in nature, and phase modulated by any changes in length which occur in the run of fiber between (but not before or after) the two reflectors. Because the laser is semi-coherent, interference does not occur with reflectors which are part of separate sensing pairs, since the distance between individual pairs is much larger than the coherence length of the laser.

As noted above, light emitted by the laser is amplitude modulated with a chirped sinusoidal pattern. The signal being used to drive the amplitude modulating element is then mixed with the electrical signal emitted by the photodetector. This has the effect of signals originating from different locations along the fiber are shifted to different frequency bands, based upon their location in the fiber.

However, because the laser was semi-coherent, and because the reflector consisted of a pair of reflectors which were sufficiently close together to interfere with one another, the signal present in each frequency band (originating from each individual sensor pair) is amplitude modulated due to the interference effects. As a result, each signal is amplitude modulated with a carrier signal, the phase modulation of which contains the previously discussed vibration information. Mathematically, the signal at a single frequency, corresponding to a single sensor pair, takes the form of:

$$I_i \propto \cos(4\pi n L \alpha t)\cos(\omega t).$$

This expression can be thought of as a sinusoidal carrier, $\cos(\omega t)$, with an amplitude modulation applied of $\cos(4\pi n L \alpha t)$. Here, $\omega$ represents the angular frequency produced by the carrier signal resulting from the amplitude modulation and the time-of-flight of the signal. If the laser were completely incoherent, the $\cos(\omega t)$ component of this expression would still exist. In that case, the amplitude of the signal would nominally be constant, since both reflectors are broadband. Since interference occurs between the two reflectors, however, the amplitude modulation occurs as well. In the amplitude modulation, L references the length between the two reflectors forming the sensing pair (and under vibration is a time-varying quantity), while a represents the sweep rate of the laser (change in wavelength/time).

Since interference only occurs between the two reflectors in close proximity, artifacts due to polarization fading are most unlikely, simply due to the short length of fiber between the two reflectors forming a sensor pair. By the same token, since interference is limited to the two reflectors in close proximity, the system is insensitive to vibration that occurs in other parts of the fiber. This can be a significant problem with conventional optical fiber sensing systems, for example.

Figure 2:
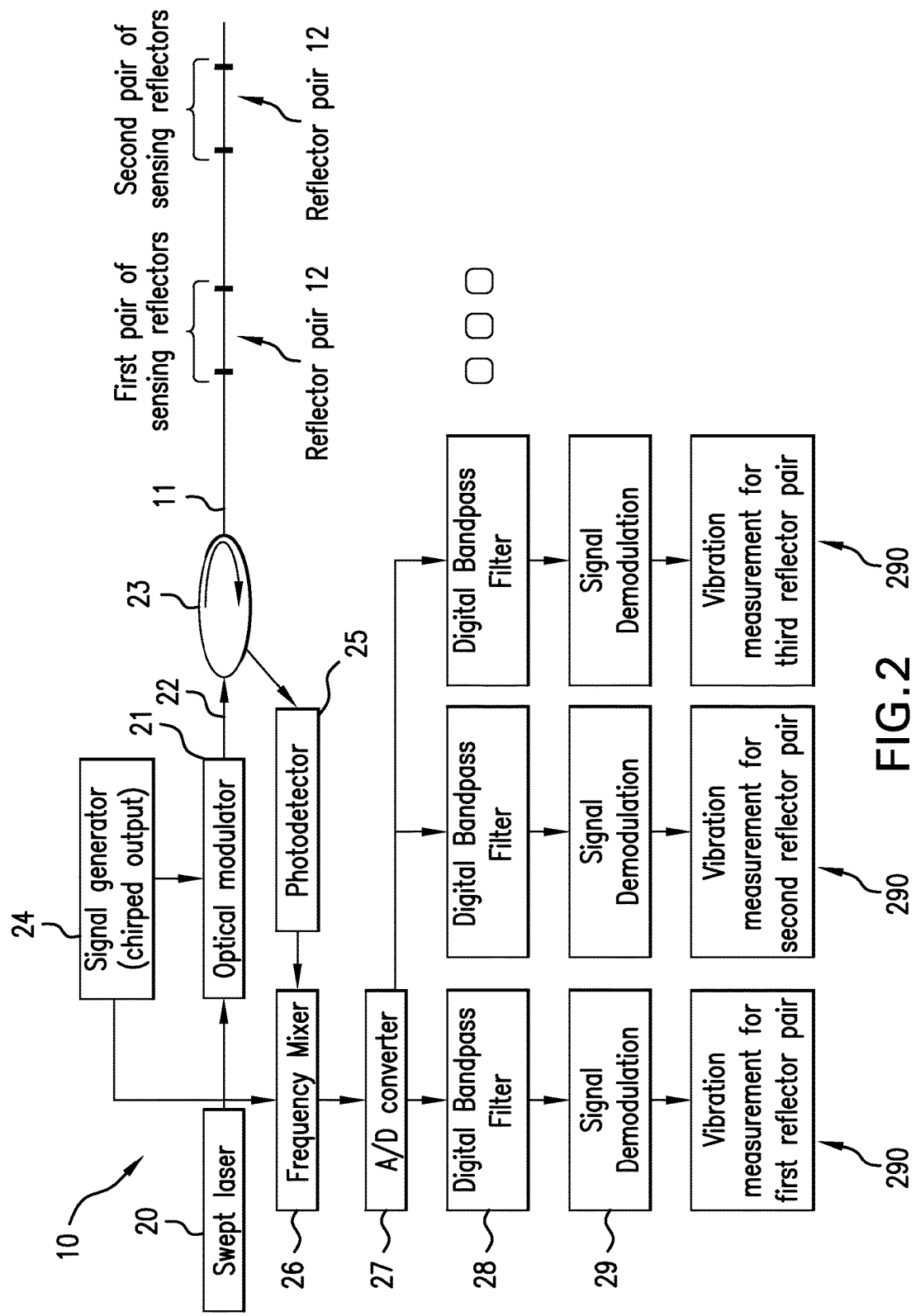
FIG. 2 illustrates a first embodiment of the vibration monitoring system.

FIG. 2 illustrates a first embodiment of the vibration monitoring system 10. In the embodiment of FIG. 2, a laser 20 is configured to emit light having a swept (i.e., changing over time in a prescribed manner) wavelength. The swept wavelength light is received by an optical modulator 21 that is configured to modulate the amplitude of the received light to provide modulated light 22. The modulated light 22 is then transmitted into the optical fiber 11 via an optical circulator 23. The received laser light is modulated by the optical modulator 21 in accordance with a signal received from a signal generator 24 having a chirped output (e.g., linearly increasing frequency). A photodetector 25 is configured to receive return light from the optical fiber 11 due to the illuminating with the modulated light 22. A frequency mixer 26 mixes (i.e., multiplies) a signal received from the photodetector 25 with the chirped output signal from the signal generator 24 to generate an output signal having two frequencies or heterodynes that are a sum of the two input frequencies and a difference of the two input frequencies. An analog-to-digital (A/D) converter 27 converts the analog output signal from the frequency mixer 26 into a digital signal. Although not illustrated separately, the A/D converter 27 includes an analog anti-aliasing filter to filter the analog signal from the frequency mixer 26 in order to filter out the high sum frequency component leaving the difference frequency component to pass for conversion to a digital signal. A digital bandpass filter 28 is configured to filter the digital signal to provide a digital signal that corresponds to a specific pair of reflectors. That is, the digital bandpass filter 28 isolates signals that are associated with a specific pair of reflectors from signals associated with other pairs of reflectors. The difference frequency component for each reflector pair (hence, many difference frequency components) represents a time delay associated with a specific reflector pair 12. Hence, any specific pair of reflectors can be interrogated based on a time delay associated with that specific pair of reflectors. The time delay is used as a basis for filtering in the digital bandpass filter 28. A signal demodulator 29 is configured to demodulate the filtered digital signal to detect an envelope of the filtered digital signal. Changes in the envelope contain information regarding the vibration being detected. Technically in one or more embodiments, the envelope is processed using amplitude demodulation followed by phase demodulation to get the vibration information. In the absence of vibration, the envelope would be modulated with a perfect sinusoid. Vibration shows up as deviations in the envelope from a perfect sinusoid (in other words, phase/frequency modulation). Further processing of the envelope can determine both the amplitude and the frequency of the vibration. A filter/demodulator set 290 is associated with each reflector pair 12 in the optical fiber 11.

Figure 3:
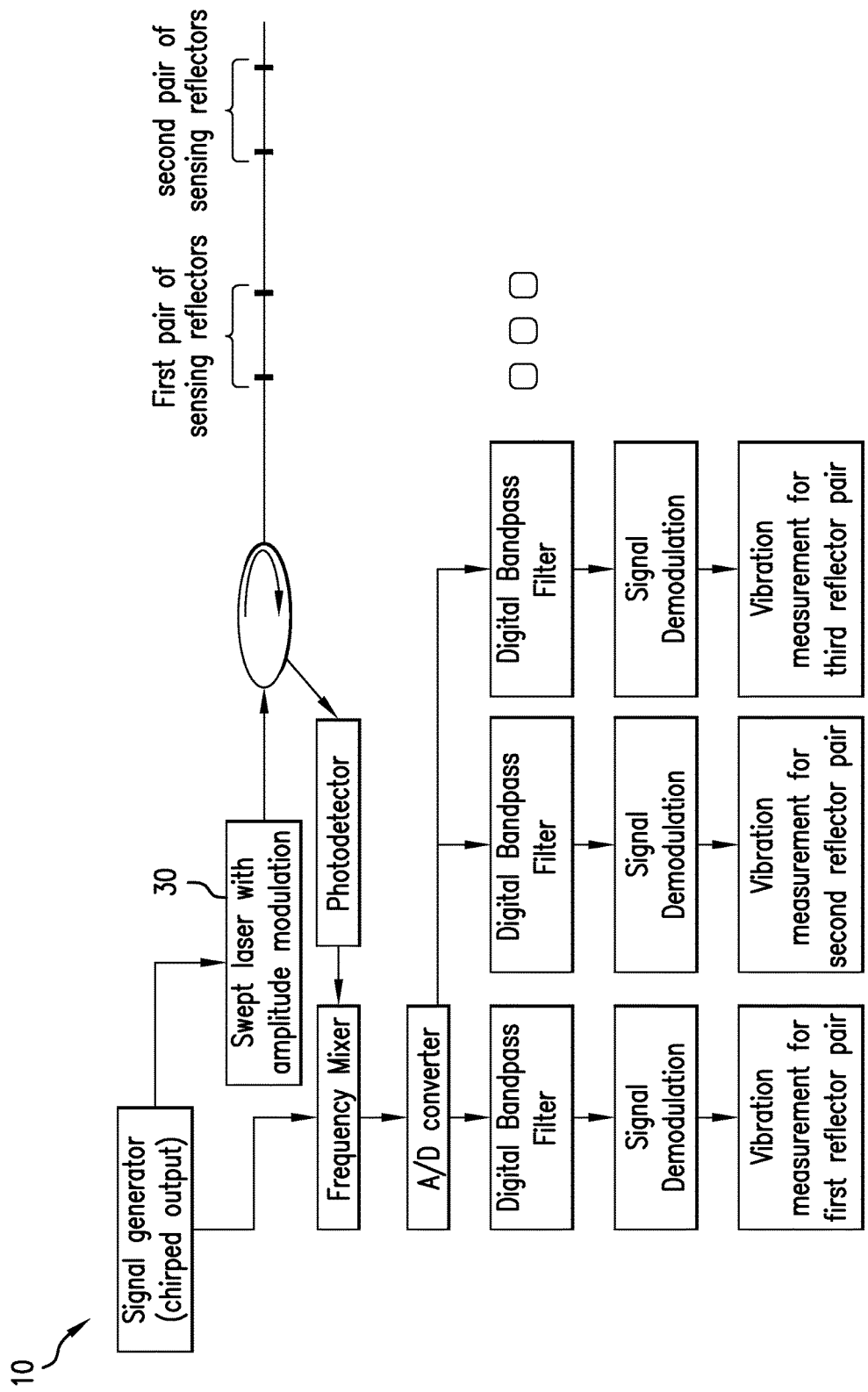
FIG. 3 illustrates a second embodiment of the vibration monitoring system, the second embodiment using intrinsic laser modulation.

FIG. 3 illustrates a second embodiment of the vibration monitoring system. In the embodiment of FIG. 3, a swept laser 30 having intrinsic modulation is used in lieu of the separate laser 20 and the separate optical modulator 21. In some instances, this embodiment may provide for a lower cost implementation by eliminating the need for an external modulator.

Figure 4:
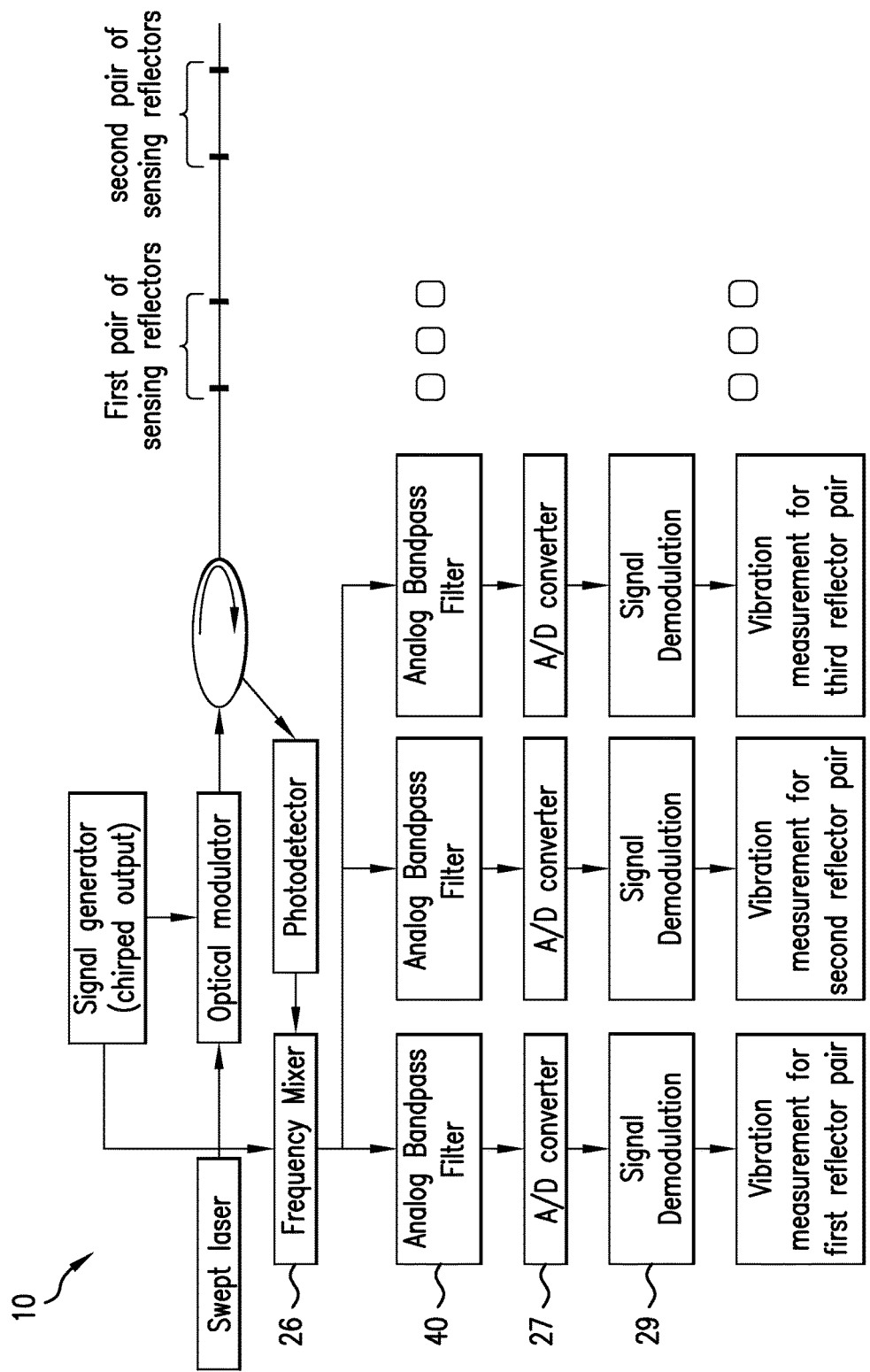
FIG. 4 illustrates a third embodiment of the vibration monitoring system, the third embodiment using analog bypass filters.

FIG. 4 illustrates a third embodiment of the vibration monitoring system. In the embodiment of FIG. 4, an analog bandpass filter 40 is used to filter the analog output signal from the frequency mixer 26 instead of the digital bandpass filter 28. Although not illustrated separately, an analog anti-aliasing filter may be included in the frequency mixer 26 in the embodiment of FIG. 4 to filter the analog frequency mixed signal in order to filter out the high sum frequency component leaving the difference frequency component to pass to the analog bandpass filter 40.

Figure 5:
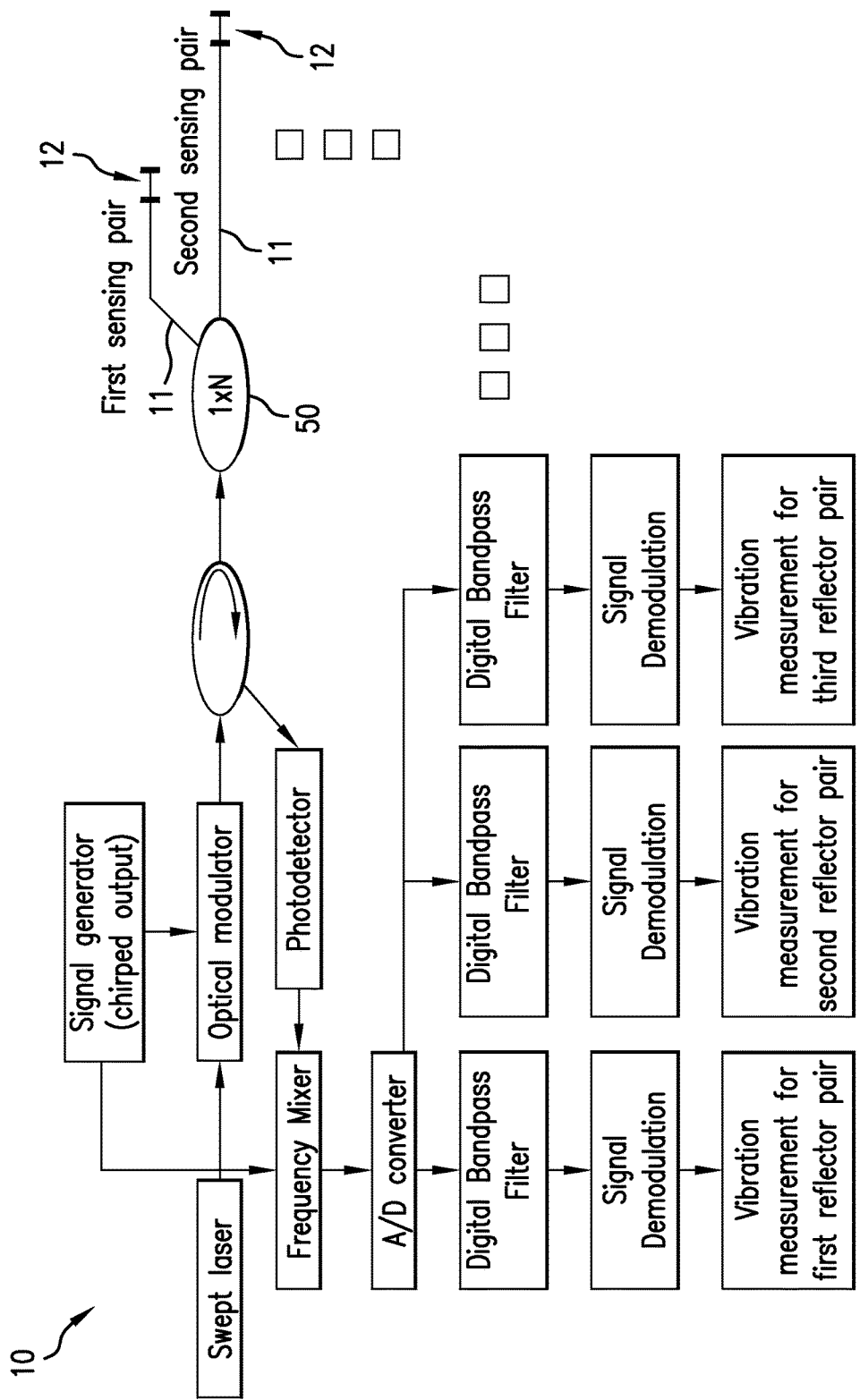
FIG. 5 illustrates a fourth embodiment of the vibration monitoring system, the fourth embodiment using multiple optical fibers.

FIG. 5 illustrates a fourth embodiment of the vibration monitoring system. In the embodiment of FIG. 5, multiple optical fibers 11 are coupled to an optical coupler 50 which in turn is coupled to the optical circulator 23. While the embodiment of FIG. 5 depicts a first sensing pair of reflectors in one optical fiber 11 and a second sensing pair of reflectors in another optical fiber 11, each optical fiber may include multiple sensing pairs of reflectors such that the light between different sensing pairs of reflectors in not coherent. In FIG. 5, if the distance between the optical coupler 50 and the first sensing pair of reflectors is D1 and the distance between the optical coupler 50 and the second sensing pair of reflectors is D2, then D2−D1=D where D is discussed above.

Figure 6:
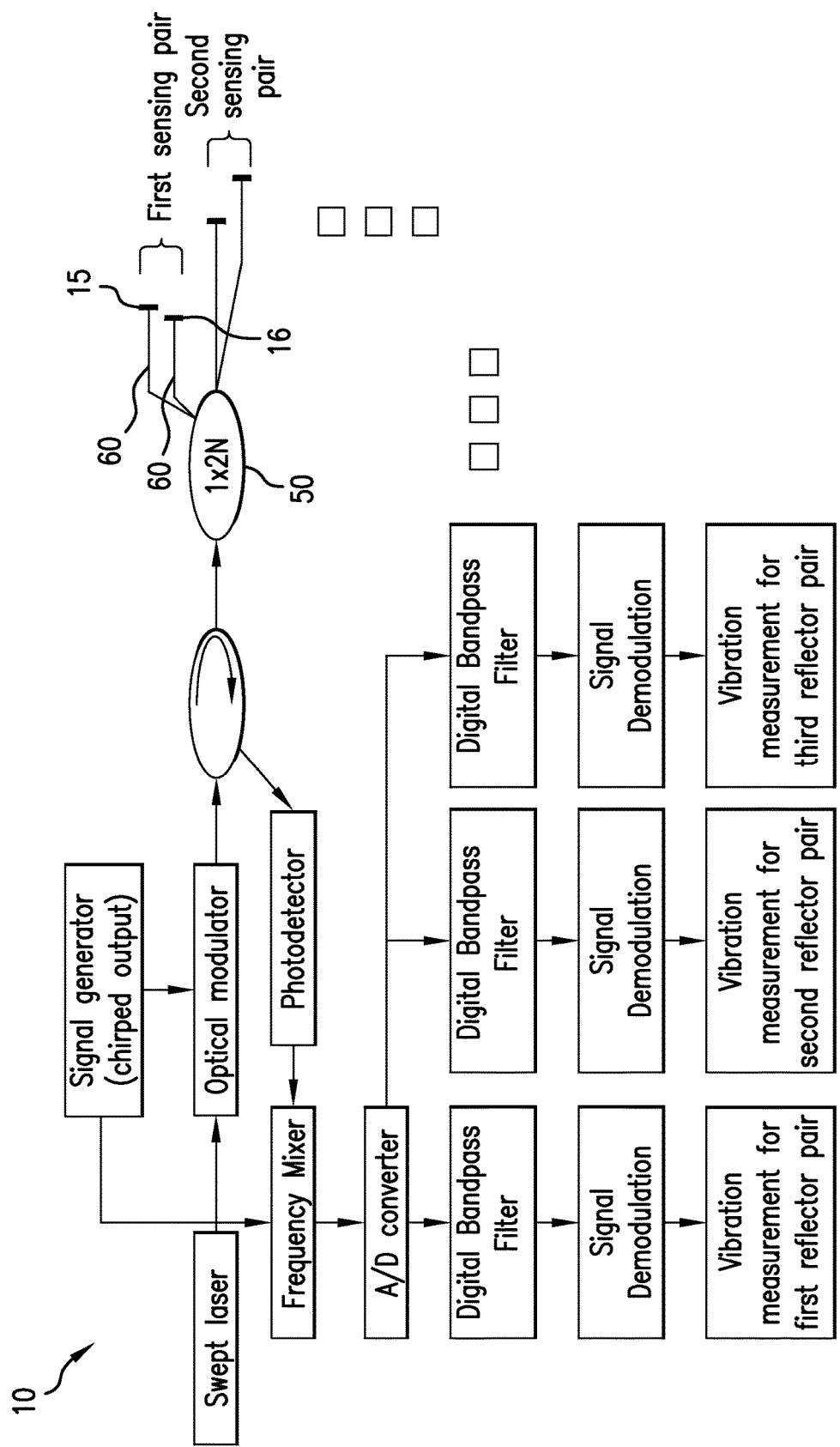
FIG. 6 illustrates a fifth embodiment of the vibration monitoring system, the fifth embodiment using optical fibers, each having one reflector.

FIG. 6 illustrates a fifth embodiment of the vibration monitoring system. In the embodiment of FIG. 6, multiple pairs of reflectors are implemented in which each reflector is in separate optical fibers 60. In the embodiment of FIG. 6, the semi-coherent laser light is coherent over a path distance D1 in each optical fiber in a first pair of optical fibers having a first sensing pair of reflectors to the corresponding reflector. A second pair of optical fibers has path distance of D2 in each optical fiber to the corresponding reflector. The semi-coherent laser light is not coherent over the differential distance D2−D1 so that the signals from the different pairs of reflectors do not interfere with each other. A photodetector configured to sense light from the first pair of optical fibers and the second pair of optical fibers and provide a photodetector output signal indicative of an amount of sensed light.

Figure 7A:
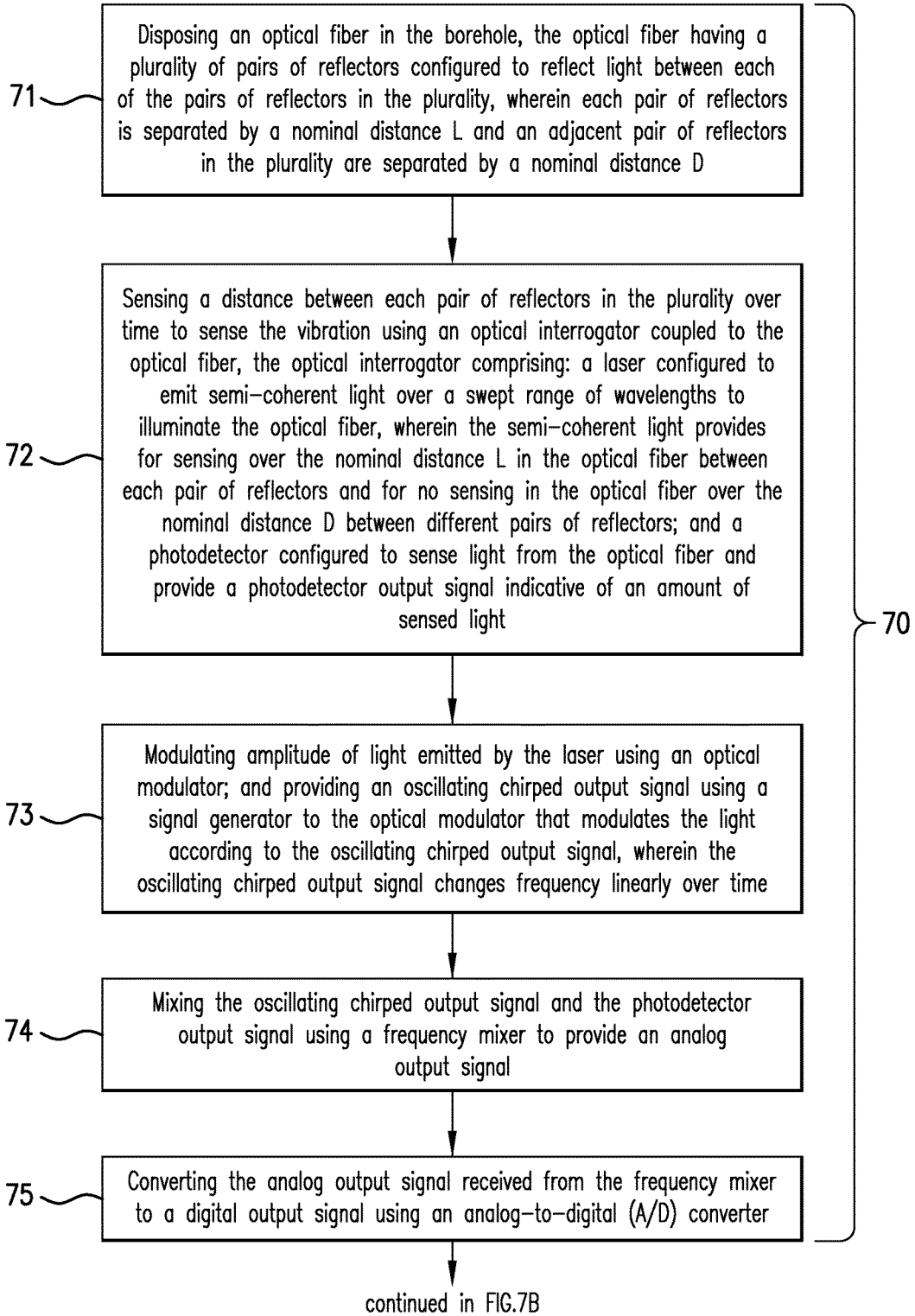
FIGS. 7A and 7B, collectively referred to as FIG. 7, are a flow chart of a method for sensing downhole vibration.
Figure 7B:
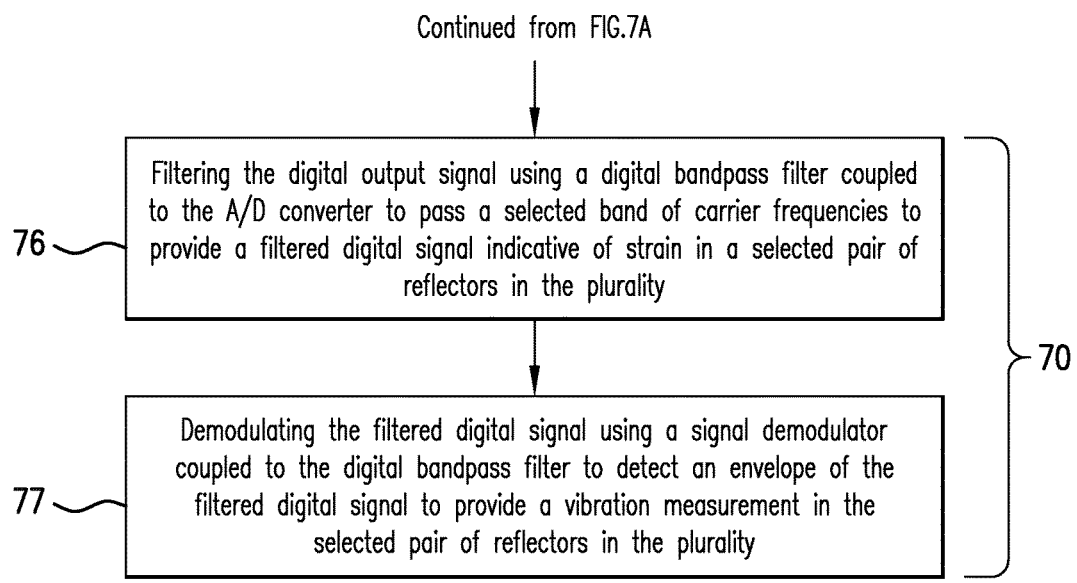

FIG. 7 is a flow chart for a method 70 for sensing vibration in a borehole penetrating the earth. Block 71 calls for disposing an optical fiber in the borehole, the optical fiber having a plurality of pairs of reflectors configured to reflect light between each of the pairs of reflectors in the plurality, wherein each pair of reflectors is separated by a nominal distance L and an adjacent pair of reflectors in the plurality are separated by a nominal distance D. Block 72 calls for sensing a distance between each pair of reflectors in the plurality over time to sense the vibration using an optical interrogator coupled to the optical fiber, the optical interrogator includes: a laser configured to emit semi-coherent light over a swept range of wavelengths to illuminate the optical fiber, wherein the semi-coherent light provides for sensing over the nominal distance L in the optical fiber between each pair of reflectors and for no sensing in the optical fiber over the nominal distance D between different pairs of reflectors; and a photodetector configured to sense light from the optical fiber and provide a photodetector output signal indicative of an amount of sensed light.

Block 73 calls for modulating amplitude of light emitted by the laser using an optical modulator; and providing an oscillating chirped output signal using a signal generator to the optical modulator that modulates the light according to the oscillating chirped output signal, wherein the oscillating chirped output signal changes frequency linearly over time. Block 74 calls for mixing the oscillating chirped output signal and the photodetector output signal using a frequency mixer to provide an analog output signal. Block 75 calls for converting the analog output signal received from the frequency mixer to a digital output signal using an analog-to-digital (A/D) converter.

Block 76 calls for filtering the digital output signal using a digital bandpass filter coupled to the A/D converter to pass a selected band of carrier frequencies to provide a filtered digital signal indicative of strain in a selected pair of reflectors in the plurality. Block 77 calls for demodulating the filtered digital signal using a signal demodulator coupled to the digital bandpass filter to detect an envelope of the filtered digital signal to provide a vibration measurement in the selected pair of reflectors in the plurality.

The method 70 may also include performing one or more downhole actions based upon the vibration measurement. The vibration measurement may be intensity or amplitude over time or a spectral characteristic in the frequency domain. In one example, water may be detected as being produced at the surface. By using a sensing pairs of reflectors as microphones for sensing vibrations in an acoustic range for frequencies, each downhole valve may be listened to in order to determine which zone is producing water. Accordingly, the controller 190 can turn off the corresponding valve of the zone producing the water. In another example, sand may be detected as flowing with hydrocarbons from a zone by listening to downhole valves. Sand flowing through a valve presents high-frequency impacts with the valve and can be detected by a spectral characteristic or intensity of sound. Accordingly, if the sound exceeds a certain threshold level, the controller 190 can turn off the corresponding valve of the zone producing the sand in order to prevent equipment damage. In another example, vibration of the electrical submersible pump (ESP) 13 can be monitored using the vibration monitoring system 10. Vibration levels or a spectral characteristic may indicate a potential problem with the ESP at a certain speed. Accordingly, the controller 190 can turn off the ESP or operate the ESP at a different speed that results in less vibration.

SOFDR provides several important benefits compared to conventional optical vibration or dynamic strain measurement systems. Because changes in intensity originate from the amplitude modulation of the light, rather than solely by interference between unmodulated reflected signals, the vibration monitoring system 10 is largely immune to polarization fading. Additionally, the vibration concerns that can interfere with conventional measurements do not affect SOFDR measurements. Finally, the frequencies produced in SOFDR are generally much lower than those produced in conventional sensing systems using an optical fiber. This is an advantage, as the maximum range that can be interrogated by conventional fiber optic sensing systems is determined by sampling speed—it is necessary to sample at least twice as fast as the frequency associated with the furthest reflector (see Nyquist-Shannon sampling theorem). In SOFDR, these frequencies are generally sufficiently low that range is controlled by power budget concerns, not sampling rates. Conventional sensing systems using fiber Bragg gratings are not sufficiently sensitive to measure most vibrations; interferometric techniques are required to obtain sufficient sensitivity. As disclosed herein, the optical interrogation approach using SOFDR provides for meaningful measurements of dynamic strain. This provides important advantages over all conventional optical strain measurement systems, which are vulnerable to polarization and other related issues.

One potential concern that could arise is that if the reflector pairs are located too close to the interrogator (in other words, the fiber is very short), the IOFDR carrier frequencies ($\omega$ in the previous expression) may be too close in frequency to the frequency of the amplitude modulation resulting from frequency effects for the two signals to be separated. There are several methods that can be used to avoid this. First, this problem can simply be avoided by inserting a sufficiently long loop of fiber into the interrogator. Alternatively, appropriate delays can be applied in the electrical circuitry to either the detector or modulator signals—this can be done using either analog circuit components or can be performed digitally. Finally, this problem can also be resolved through the use of two separate synthesizing elements, generating two separate chirp signals (with an appropriate delay between the two synthesizers). In this scenario, one synthesizer would drive the optical modulator, while the other would serve as the local oscillator for the frequency mixer.

In support of the teachings herein, various analysis components may be used, including a digital and/or an analog system. For example, the optical interrogator 18, the computer processing system 19, and or the controller 190 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for sensing vibration in a borehole penetrating the earth, the apparatus comprising:
    an optical fiber disposed in the borehole and comprising a plurality of pairs of reflectors configured to reflect light between each of the pairs of reflectors in the plurality, wherein each pair of reflectors is separated by a nominal distance L and an adjacent pair of reflectors in the plurality are separated by a nominal distance D; and
    an optical interrogator coupled to the optical fiber and configured to sense a distance between each pair of reflectors in the plurality over time to sense the vibration, the optical interrogator comprising:
        a laser configured to emit semi-coherent light over a swept range of wavelengths to illuminate the optical fiber, wherein the semi-coherent light provides for sensing over the nominal distance L in the optical fiber between each pair of reflectors and for no sensing in the optical fiber over the nominal distance D between different pairs of reflectors; and
        a photodetector configured to sense light from the optical fiber and provide a photodetector output signal indicative of an amount of sensed light.

2. The apparatus according to claim 1, further comprising an optical circulator having a first port coupled to the laser, a second port coupled to the optical fiber, and a third port coupled to the photodetector.

3. The apparatus according to claim 2, wherein the optical fiber comprises a plurality of optical fibers, each optical fiber in the plurality of optical fibers comprising a plurality of pairs of reflectors.

4. The apparatus according to claim 3, further comprising an optical coupler coupled to optical circulator and the plurality of optical fibers.

5. The apparatus according to claim 1, wherein the optical interrogator further comprises an optical modulator configured to modulate amplitude of light emitted by the laser.

6. The apparatus according to claim 5, wherein the optical interrogator further comprises a signal generator providing an oscillating chirped output signal to the optical modulator that modulates the light according to the oscillating chirped output signal, wherein the oscillating chirped output signal changes frequency linearly over time.

7. The apparatus according to claim 6, wherein the optical interrogator further comprises a frequency mixer coupled to the photodetector and the signal generator and configured to mix the oscillating chirped output signal and the photodetector output signal.

8. The apparatus according to claim 7, wherein the optical interrogator further comprises an analog-to-digital (A/D) converter coupled to the frequency mixer and configured to provide a digital output signal.

9. The apparatus according to claim 8, wherein the optical interrogator further comprises a digital bandpass filter coupled to the A/D converter and configured to pass a selected band of carrier frequencies to provide a filtered digital signal indicative of light interference in a selected pair of reflectors in the plurality.

10. The apparatus according to claim 9, wherein the optical interrogator further comprises a signal demodulator coupled to the digital bandpass filter and configured to detect an envelope of the filtered digital signal to provide a vibration measurement in the selected pair of reflectors in the plurality.

11. The apparatus according to claim 10, wherein the optical interrogator further comprises a plurality of sets comprising the digital bandpass filter and the signal demodulator, each set corresponding to each pair of reflectors in the plurality of pairs of reflectors.

12. The apparatus according to claim 7, wherein the optical interrogator further comprises an analog bandpass filter coupled to the frequency mixer and configured to pass a selected band of carrier frequencies to provide a filtered analog signal indicative of light interference in a selected pair of reflectors in the plurality.

13. The apparatus according to claim 12, wherein the optical interrogator further comprises (i) an analog-to-digital (A/D) converter coupled to the analog bandpass filter and configured to provide a digital output signal and (ii) a signal demodulator coupled to the A/D converter and configured to detect an envelope of the digital output signal to provide a vibration measurement in the selected pair of reflectors in the plurality.

14. The apparatus according to claim 1, wherein the laser is intrinsically configured to modulate amplitude of light emitted by the laser.

15. The apparatus according to claim 1, further comprising a controller configured to control downhole equipment in accordance with the sensed vibration.

16. An apparatus for sensing vibration in a borehole penetrating the earth, the apparatus comprising:
a first pair of optical fibers and a second pair of optical fibers disposed in the borehole, each optical fiber comprising one reflector such that light is reflected between the two reflectors in the first pair of optical fibers and in the two reflectors in the second pair of optical fibers, wherein a first pair of reflectors in the first pair of optical fibers has a path distance D1 and a second pair of reflectors in the second pair of optical fibers has a distance D2 wherein D1 is less than D2; and
an optical interrogator coupled to the optical fiber and configured to sense a distance between each pair of reflectors in the first pair of optical fibers and the second pair of optical fibers over time to sense the vibration, the optical interrogator comprising:
a laser configured to emit semi-coherent light over a swept range of wavelengths to illuminate the first pair of optical fibers and the second pair of optical fibers, wherein the semi-coherent light is coherent over D1 and not coherent over a differential distance D2-D1;
a photodetector configured to sense light from the first pair of optical fibers and the second pair of optical fibers and provide a photodetector output signal indicative of an amount of sensed light.

17. A method for sensing vibration in a borehole penetrating the earth, the method comprising:
disposing an optical fiber in the borehole, the optical fiber comprising a plurality of pairs of reflectors configured to reflect light between each of the pairs of reflectors in the plurality, wherein each pair of reflectors is separated by a nominal distance L and an adjacent pair of reflectors in the plurality are separated by a nominal distance D; and
sensing a distance between each pair of reflectors in the plurality over time to sense the vibration using an optical interrogator coupled to the optical fiber, the optical interrogator comprising:
a laser configured to emit semi-coherent light over a swept range of wavelengths to illuminate the optical fiber, wherein the semi-coherent light provides for sensing over the nominal distance L in the optical fiber between each pair of reflectors and for no sensing in the optical fiber over the nominal distance D between different pairs of reflectors; and
a photodetector configured to sense light from the optical fiber and provide a photodetector output signal indicative of an amount of sensed light.

18. The method according to claim 17, further comprising:
modulating amplitude of light emitted by the laser using an optical modulator; and
providing an oscillating chirped output signal using a signal generator to the optical modulator that modulates the light according to the oscillating chirped output signal, wherein the oscillating chirped output signal changes frequency linearly over time.

19. The method according to claim 18, further comprising mixing the oscillating chirped output signal and the photodetector output signal using a frequency mixer to provide an analog output signal.

20. The method according to claim 19, further comprising converting the analog output signal received from the frequency mixer to a digital output signal using an analog-to-digital (A/D) converter.

21. The method according to claim 20, further comprising filtering the digital output signal using a digital bandpass filter coupled to the A/D converter to pass a selected band of carrier frequencies to provide a filtered digital signal indicative of light interference in a selected pair of reflectors in the plurality.

22. The method according to claim 21, further comprising demodulating the filtered digital signal using a signal demodulator coupled to the digital bandpass filter to detect an envelope of the filtered digital signal to provide a vibration measurement in the selected pair of reflectors in the plurality.

23. The method according to claim 17, further comprising performing a downhole action using a controller configured to control downhole equipment based upon the sensed vibration.

* * * * *